Jan. 5, 1965  J. TOLCISS  3,164,148
INSULATED CONTAINER
Filed Jan. 15, 1964
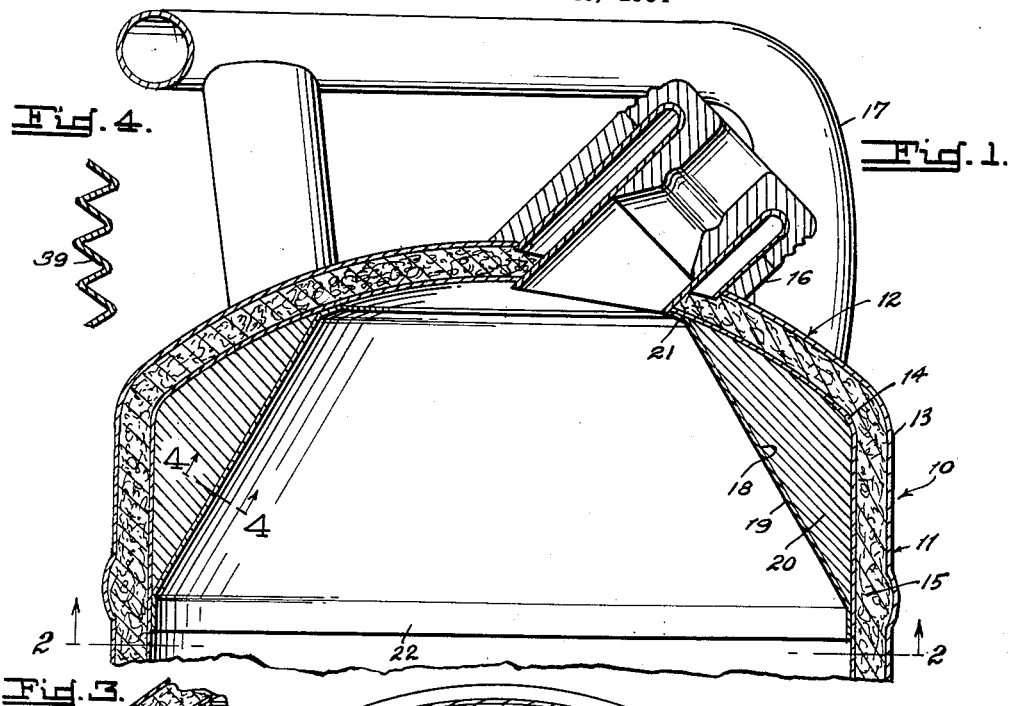
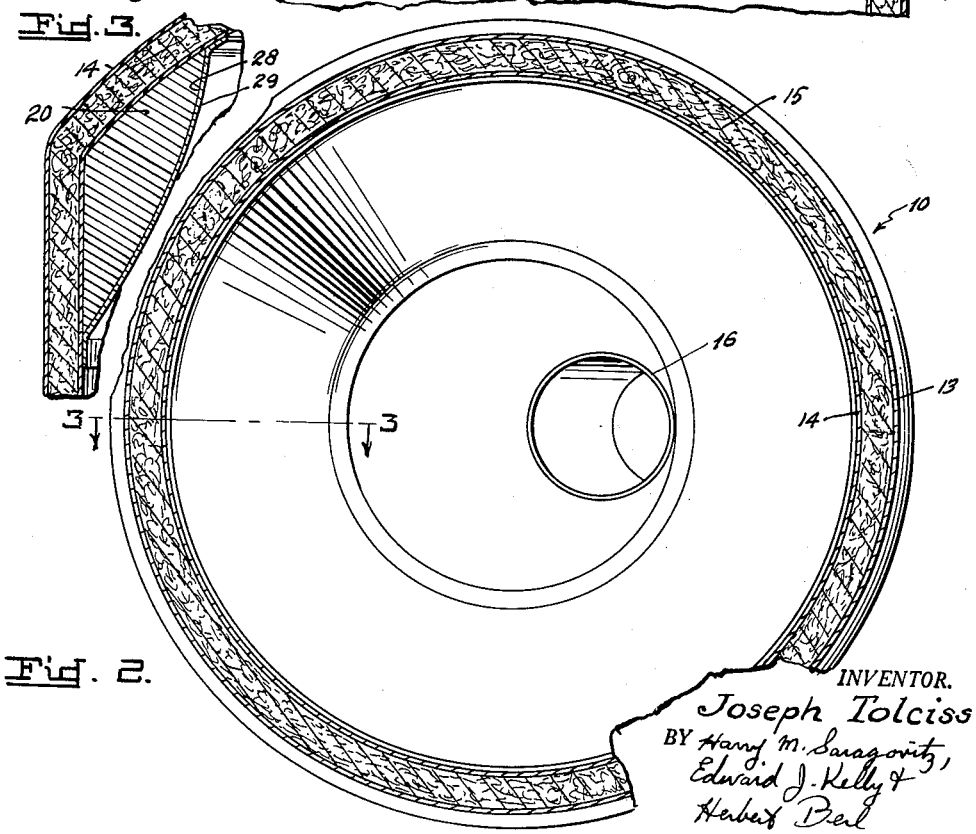
INVENTOR.
Joseph Tolciss
BY Harry M. Saragovitz,
Edward J. Kelly &
Herbert Berl

United States Patent Office 3,164,148
Patented Jan. 5, 1965

3,164,148
INSULATED CONTAINER
Joseph Tolciss, Bayside, N.Y., assignor to the United States of America as represented by the Secretary of the Army
Filed Jan. 15, 1964, Ser. No. 337,963
5 Claims. (Cl. 126—375)

The invention relates to insulated containers and more particularly to such containers as are used for keeping food or drink either hot or cold particularly the former.

In cold climates, as the Arctic or Antarctic, keeping hot food or drink heated out of doors is a problem and use of the usual insulated containers in many instances will not keep the commodity hot for a sufficient time to enable it to be transported from a kitchen area to the place of consumption, such as a military outpost.

It is impractical to utilize a high vacuum for insulation in large sized containers. Consequently, it is necessary to use a low vacuum or a dead air space in combination with insulating material such as absestos, fiber glass or the like. However, an objectionable feature of such insulating material is that it tends to pack with time so that it becomes concentrated in the lowermost part of the hollow container wall so as to leave little or no insulating material in the topmost areas thereof.

It has long been known that the efficiency of insulated containers can be enhanced by the use of bodies of crystals of various kinds which are first liquified by heat and thereafter permitted to crystallize in which process they give off heat which may be used for fireless cooking. Examples of such apparatus and compounds may be found in the U.S. Patents Nos. 1,412,717, 2,640,478, and 2,791,204.

For instance, it is estimated that three pounds of an available heat additive material in a compartment according to the invention in a fifteen quart container will produce six additional hours of heat holding time to maintain the heat of the contents of the container at 140° F. As such material is available at not more than two to three cents a pound and is reusable in perpetuity, it is obvious that the additional cost per container is trivial.

With the foregoing in view, it is an object of the invento to provide a novel insulated container utilizing a novel arrangement of a heat storing compound of the class described.

A further object is to provide a novel insulated container which contains a body of fusible heat storing and diffusing material disposed around the top of the container wall to offset any loss of heat through an upper double wall area which may be depleted of insulation by the packing thereof.

A further object is to provide a novel chamber for heat storing and diffusing material which can be manufactured at low cost, and which is capable of being applied to standard insulated containers during the manufacture thereof with a minimum of change in tooling and assembly operations.

Other objects and advantages reside in the specific structures of the invention, combination of the same with a container and the particular location of the same in a container, all of which will be readily apparent to those skilled in the art upon reference to the attached drawing and to the following specification wherein the invention is shown, described and claimed.

In the drawing:

FIGURE 1 is a fragmentary vertical sectional view through a container showing one species of the invention applied thereto;

FIGURE 2 is a transverse sectional view taken substantially on the plane of the line 2—2 of FIGURE 1;

FIGURE 3 is fragmentary sectional view taken on a plane corresponding to the line 3—3 of FIGURE 2 but showing a modification of the invention; and FIGURE 4 is fragmentary sectional view taken on a plane corresponding to the line 4—4 of FIGURE 1 but illustrating a further modification of the invention.

Referring specifically to the drawing, wherein like reference characters designate like parts in all views, and referring at first to the species of invention disclosed in FIGURES 1 and 2, 10 designates generally a container to which the invention has been applied. In the embodiment illustrated, container 10 is an insulated container having a cylindrical side wall 11 and at least one end wall 12, in this case the top wall. It is understood that the container has a similar or any suitable bottom wall, not shown. The side and top walls 11 and 12 are preferably formed of an outer wall 13 and an inwardly spaced inner wall 14. Walls 13 and 14 are formed of any suitable impervious sheet material such as sheet metal or plastic and the space therebetween is filled with any suitable insulating material 15. The container illustrated is for liquids and includes any suitable pouring spout 16 which opens into the interior of the container through the top wall 12. Insulating material such as 15, has been omitted from the relatively narrow space between the walls of spout 16 because it is not needed there. Such top wall, likewise has secured thereto any suitable carrying handle 17. As illustrated, the spout 16 and handle 17 correspond to the like elements disclosed more fully in my co-pending application Serial No. 337,964, filed January 15, 1964, and my application for Design Patent Serial No. D. 78,204, filed January 15, 1964.

As aforesaid, it is impractical to make a high vacuum container in large size and the usual thermal insulation used such as asbestos fibers, fiber glass or corresponding loose insulation, tends to pack toward the bottom of the insulating chamber, leaving a reduced amount of insulaiton or none at all at the upper portion of the chamber between the container walls. To overcome this objectionable feature, there has been provided an annular chamber 18 which is of substantially triangular shape in cross section and which is defined on the outside by adjacent or contiguous portions of the side and top walls 11 and 12 and on the inside by a hollow frusto-conical partition 19 which is formed with upper and lower flanges 21 and 22 which are secured to the inner surface of top and side portions of the inner wall 14 in any suitable manner, not shown, as by welding. Partition 19 is formed of any suitable impervious sheet material, metal or plastic. A metal wall having good heat transmitting characteristics is preferred. The chamber 18 is filled with any suitable fusible heat stabilizing compound 20 having the characteristics of one or more of the like materials disclosed in the U.S. Patents Nos. 1,412,717, 2,640,478 and 2,791,204 aforesaid. Generally speaking, as the material is not used for cooking, it is desirable that the temperature emitted during the crystallization period be not higher than the boiling point of water at sea level so as to avoid boiling the liquid in the container 10.

As best seen in FIGURE 1, the chamber 18 covers the inside of the upper portion of the side wall 11 and a substantial portion of the top wall 12 whereby to provide heat to these areas where the insulation 15 is likely to be the sparsest. The inner surface of the partition 19 is in direct contact with the liquid, not shown, in container 10 to heat the same as the compound 20 crystallizes. Such heating causes at least limited circulation of the liquid in the container whereby to enhance the isulating properties of the container 10. The material 20 is preheated to fuse the same by filling the container 10 with a heated liquid for a period and then draining this liquid before the contents are added to the container.

In the modification of FIGURE 3, the structure is the same except that the surface area of the partition 29 has been increased by forming the same with a concavo-convex configuration in longitudinal section. As the convex surface of partition 29 faces inwardly of the container, the capacity of chamber 28 for the compound 20 is also increased whereby to increase the efficiency of the device in a manner readily understood.

In the modification of FIGURE 4, the partition 39 is formed with a corrugated configuration in which the corrugations run longitudinally of the container 10 so as not to impede the flow of liquids out of the same. As in the species of FIGURE 3, this species increases the size of the annular chamber and the surface area of the partition.

It is apparent from the foregoing that the invention supplies supplementary heat to fluid in an insulated container and increases the length of time that the fluid remains heated. Also, such supplemental heat is applied at an area where the insulation tends to be the least dense or effective. It is apparent also, that the invention may readily be applied to standard containers of the class described by merely welding or soldering the annular partitions 19, 29 or 39 to the inner wall 14 prior to assembly with the outer wall. Such an addition would amount to no more than a single additional operation which would add but little to the cost of manufacture beyond the cost of the partition.

Moreover, while there has been shown and described what is now thought to be the preferred embodiments of the invention, it should be understood that the same is susceptible of still other forms and expressions. Consequently, it is not my intention to limit myself to the precise structures shown and described hereinabove but only as hereinafter claimed. For instance, it is within the concept of the invention to locate the chamber aforesaid at the bottom of the container instead of at the top or to have chambers at both the bottom and top of the container.

I claim:

1. In a fluid container having inner and outer cylindrical side walls, insulation material between said walls, and at least one end wall merging therewith at an angle; the improvement comprising an annular partition fixed to said inner side and end walls to provide therewith an annular chamber which is substantially triangular in cross section and includes therein contiguous portions of said side and end walls, and a body of fusible heat stabilizing compound sealed in said annular chamber and filling the same.

2. In an insulated container having radially spaced inner and outer cylindrical side walls and an end wall merging with said side walls at an angle, insulating material between said side walls; the improvement comprising a hollow frusto-conical partition fixed to said inner side and end walls, and a body of fusible heat stabilizing compound including therein contiguous annular portions of said side and end walls, and a body of fusible heat stabilizing compound sealed in said chamber and filling the same.

3. An insulated container according to claim 2, wherein said partition is formed to have a circular configuration in transverse cross section and a straight configuration in longitudinal section.

4. An insulated container according to claim 2, wherein said partition is formed to have a circular configuration in transverse section and a concavo-convex configuration in longitudinal section.

5. An insulated container according to claim 2, wherein said partition is formed to have an annular corrugated configuration in horizontal section and a straight configuration in longitudinal section.

References Cited by the Examiner
UNITED STATES PATENTS

| | | | |
|---|---|---|---|
| 2,733,710 | 2/56 | Zibell | 126—246 X |
| 2,876,634 | 3/59 | Zimmerman et al. | 126—246 X |

FOREIGN PATENTS

| | | |
|---|---|---|
| 440,144 | 4/12 | France. |

JAMES W. WESTHAVER, *Primary Examiner.*
ROBERT A. DUA, *Examiner.*